(12) United States Patent
Kim et al.

(10) Patent No.: US 9,891,664 B2
(45) Date of Patent: Feb. 13, 2018

(54) ELECTRONIC DEVICE HAVING STANDING UNIT

(71) Applicant: Samsung Electronics Co., Ltd, Gyeonggi-do (KR)

(72) Inventors: Haesoo Kim, Gyeonggi-do (KR); Felix Heck, London (GB); Yuna Oh, London (GB); Yoobong Chun, Seoul (KR); Woojung Shim, Suwon-si (KR); Seungwoon Lee, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/379,428

(22) Filed: Dec. 14, 2016

(65) Prior Publication Data

US 2017/0168524 A1 Jun. 15, 2017

(30) Foreign Application Priority Data

Dec. 14, 2015 (KR) .................. 10-2015-0178636

(51) Int. Cl.
*G06F 1/16* (2006.01)
*H04B 1/3877* (2015.01)

(52) U.S. Cl.
CPC ............ *G06F 1/1626* (2013.01); *G06F 1/166* (2013.01); *G06F 1/1681* (2013.01); *H04B 1/3877* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,940,204 A | * | 7/1990 | Nelson | F16M 11/10 248/455 |
| 8,154,868 B2 | * | 4/2012 | Xu | G06F 1/1616 248/917 |
| 8,213,163 B2 | | 7/2012 | Wu et al. | |
| 8,254,104 B2 | * | 8/2012 | Wu | H04M 1/0237 361/679.09 |

(Continued)

FOREIGN PATENT DOCUMENTS

DE 20115872 U1 2/2002

OTHER PUBLICATIONS

European Search Report dated Apr. 19, 2017 in connection with European Patent Application No. EP 16 20 0306.5.

*Primary Examiner* — Lisa Lea Edmonds

(57) ABSTRACT

Disclosed is an electronic device that includes a standing unit capable of obliquely supporting the main body. The electronic device may include: a main body that includes a first surface on which a display is disposed and a second surface that is opposite to the first surface; a standing unit received in the second surface of the main body so as to be concealed from the outside or extracted from the second surface of the main body so as to obliquely support the main body; and a cover disposed on the second surface of the main body to operate in conjunction with the standing unit, the cover being configured to allow the received standing unit to be hidden and to obliquely support the main body together with the standing unit, and the standing unit may be received in, or extracted from, the second surface by rotational, tensile, and compressive operations.

20 Claims, 23 Drawing Sheets

(56) References Cited

U.S. PATENT DOCUMENTS

| | | | |
|---|---|---|---|
| 8,259,443 B2* | 9/2012 | Wu | A47B 96/00 16/239 |
| 8,567,740 B2* | 10/2013 | Tarnutzer | A47B 23/043 248/454 |
| 8,599,542 B1 | 12/2013 | Healey et al. | |
| 8,605,430 B2* | 12/2013 | Chen | G06F 1/1616 345/168 |
| 8,646,368 B1 | 2/2014 | Clark | |
| 8,934,219 B2 | 1/2015 | Gartrell et al. | |
| 9,036,347 B2* | 5/2015 | Kuo | F16M 11/10 361/679.59 |
| 2006/0243878 A1* | 11/2006 | Saad | A47B 91/02 248/346.01 |
| 2008/0024975 A1* | 1/2008 | Huang | G06F 1/162 361/679.44 |
| 2008/0062624 A1* | 3/2008 | Regen | G06F 1/1616 361/679.3 |
| 2011/0176261 A1* | 7/2011 | Wu | H04M 1/0237 361/679.01 |
| 2012/0218699 A1* | 8/2012 | Leung | G06F 1/1616 361/679.08 |
| 2012/0293926 A1* | 11/2012 | Duan | H04M 1/0235 361/679.01 |
| 2012/0293927 A1* | 11/2012 | Duan | G06F 1/1616 361/679.01 |
| 2013/0170119 A1* | 7/2013 | Lai | H05K 5/0226 361/679.02 |
| 2013/0242472 A1* | 9/2013 | Guo | F16M 11/10 361/679.01 |
| 2014/0002962 A1* | 1/2014 | Mai | G06F 1/1679 361/679.01 |
| 2014/0063712 A1* | 3/2014 | Chung | G06F 1/1615 361/679.09 |
| 2014/0153176 A1* | 6/2014 | Ashcraft | G06F 1/1656 361/679.21 |
| 2014/0293534 A1* | 10/2014 | Siddiqui | E05D 7/00 361/679.55 |
| 2014/0321038 A1* | 10/2014 | Park | G06F 1/1681 361/679.09 |
| 2015/0173221 A1* | 6/2015 | Yoo | H05K 5/0234 248/455 |

* cited by examiner

ELECTRONIC DEVICE HAVING STANDING UNIT

CROSS-REFERENCE TO RELATED APPLICATION(S) AND CLAIM OF PRIORITY

The present application is related to and claims the priority under 35 U.S.C. § 119(a) to Korean Application Serial No. 10-2015-0178636, which was filed in the Korean Intellectual Property Office on Dec. 14, 2015, the entire content of which is hereby incorporated by reference.

TECHNICAL FIELD

Various embodiments of the present disclosure relate to an electronic device that includes a standing unit.

BACKGROUND

Electronic devices with large screens, such as notebook computers or tablet PCs, may include exterior covers (or book covers) for the purpose of protecting and obliquely supporting displays.

The exterior covers may support the rear surfaces of the electronic devices while being folded in a specific form in order to obliquely support the displays.

Furthermore, the electronic devices may include separate cradles in order to obliquely support the displays.

SUMMARY

The exterior covers that support the displays by supporting the rear surfaces of the electronic devices are limited to two or three preset types. Accordingly, the exterior covers have difficulty satisfying various screen tilt angles desired by users.

To address the above-discussed deficiencies, it is a primary object to provide an electronic device that includes a standing unit capable of obliquely supporting the main body at various angles.

Various embodiments of the present disclosure may provide an electronic device in which a standing unit is disposed to be completely hidden within the main body.

Various embodiments of the present disclosure may provide an electronic device having a standing unit that uses a frictional sliding operation.

Various embodiments of the present disclosure may provide an electronic device having a standing unit that is received within the main body or is extracted from the main body to obliquely support the main body by rotation, insertion, or extraction.

Various embodiments of the present disclosure may provide an electronic device having a standing unit that obliquely supports the main body using frictional, resilient, and hydraulic operations.

Various embodiments of the present disclosure may provide an electronic device in which a cover and a standing unit are easily opened and closed.

Various embodiments of the present disclosure may provide an electronic device in which the hinge unit of a cover assists with the support force of a standing unit.

An electronic device, according to various embodiments of the present disclosure, may include: a main body that includes a first surface on which a display is disposed and a second surface that is opposite to the first surface; a standing unit received in the second surface of the main body so as to be concealed from the outside, or extracted from the second surface of the main body so as to obliquely support the main body; and a cover disposed on the second surface of the main body to operate in conjunction with the standing unit, the cover being configured to allow the received standing unit to be hidden and to obliquely support the main body together with the standing unit, and the standing unit may be received in, or extracted from, the second surface by rotational, tensile, and compressive operations.

An electronic device, according to various embodiments of the present disclosure, may include: a main body that includes a first surface on which a display is disposed and a second surface that is opposite to the first surface; a standing unit that includes a sliding unit and a support unit connected with the sliding unit, wherein the sliding unit is configured to move while being received in the second surface of the main body, and the support unit is disposed to be concealed from the outside or is extracted from the second surface of the main body to obliquely support the main body; and a cover disposed on the second surface of the main body to operate in conjunction with the support unit, the cover being configured to allow the received sliding unit and support unit to be hidden and to obliquely support the main body together with the support unit. The sliding unit may be configured to perform tensile and compressive operations within the main body, the support unit may be configured to perform rotational, tensile, and compressive operations, and the sliding unit and the support unit may be configured to move similar to a joint.

Various embodiments of the present disclosure provide an electronic device having a standing unit that is capable of obliquely supporting the main body in an easy and simple manner and being stably stored while the electronic device is being carried.

Various embodiments of the present disclosure provide an electronic device that uses a cover having a large area as a bottom support so that it is possible to more stably support the electronic device when a user works with the electronic device on his/her lap or on an uneven surface, as well as on a flat part, such as a table, etc.

Various embodiments of the present disclosure provide an electronic device that is capable of minimizing a movement of the main body when a touch is performed on the display (a push force is applied to the display).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
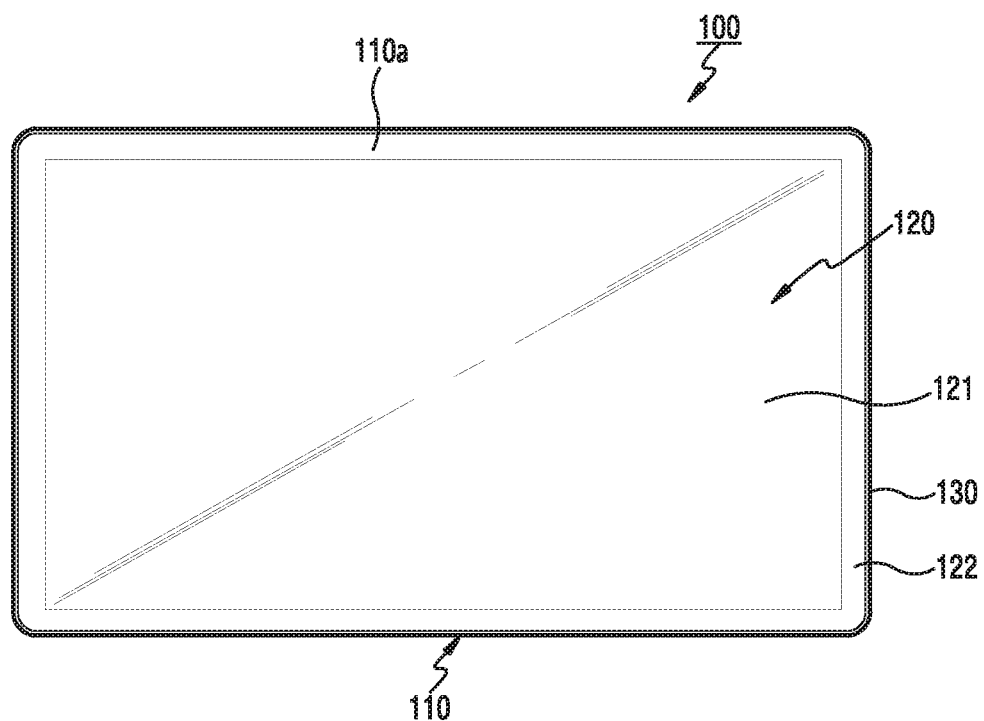
FIG. 1A illustrates a first surface of an electronic device according to various embodiments of the present disclosure.

FIGS. 1A through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have," "may have," "include," or "may include" refers to the existence of a corresponding feature (e.g., numeral, function, operation, or constituent element such as component), and does not exclude one or more additional features.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expressions such as "first," "second," or the like used in various embodiments of the present disclosure may modify various elements regardless of order or importance, and do not limit corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

In some embodiments, an electronic device may be a smart home appliance. The smart home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC™, APPLE TV™, or GOOGLE TV™), a game console (e.g., XBOX™ and PLAYSTATION™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Figure 1B:
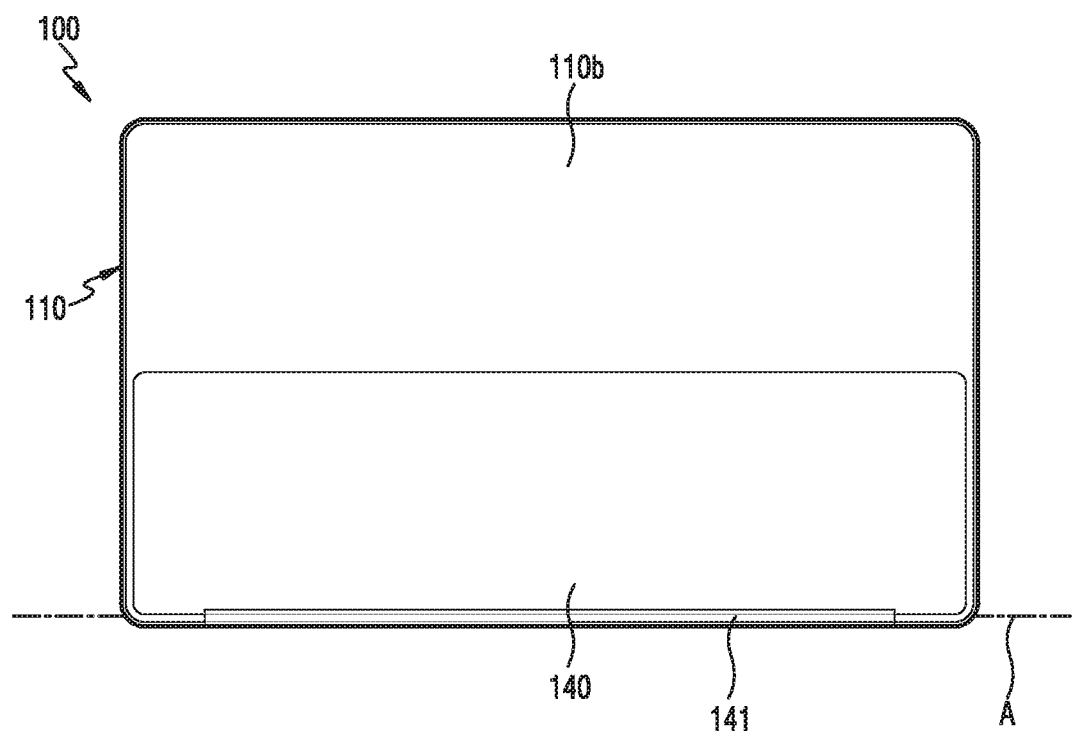
FIG. 1B illustrates a second surface of the electronic device according to various embodiments of the present disclosure.

FIG. 1A illustrates a first surface 110a of the main body 110 of an electronic device 100 according to various embodiments. FIG. 1B illustrates a second surface 110b of the main body 110 of the electronic device 100 according to various embodiments.

Referring to FIGS. 1A and 1B, the main body 110 of the electronic device 100, according to various embodiments, may include the first surface 110a and the second surface 110b that is opposite to the first surface 110a. The first surface 110a may be referred to as the front surface since the first surface 110a is located on the upper portion of the main body 110, and the second surface 110b may be referred to as the rear surface since the second surface 110b is located on the lower portion of the main body 110. A display 120 may be disposed on the front surface 110a of the main body according to various embodiments. The front surface 110a of the main body 110, according to various embodiments, may include a display area 121 where the display 120 is disposed and various types of data are displayed and a non-display area 122. For example, the non-display area 122 may be referred to as a bezel area or black matrix (BM) area.

The display 120, according to various embodiments, may be formed to be large in size in order to occupy most of the front surface 110a of the main body 110. For example, the display 120 may have a touch sensitive panel disposed thereon and may be configured as a touch screen accordingly.

The main home screen displayed on the display 120 may be the first screen that is displayed on the display 120 when the electronic device 100 is turned on. For example, in a case where the electronic device 100 has several pages of different home screens, the main home screen may be the first of the several pages of home screens. On the home screen, short-cut icons for executing frequently used applications, a main menu switching key, time, weather, etc. may be displayed. The main menu switching key may be used to display a menu screen on the display 120.

A status bar for indicating the state of the electronic device 100, such as a battery charging state, the intensity of a received signal, and the current time, may be displayed on the upper side of the display 120 according to various embodiments. A home key, a menu key, a back key, and the like may be formed on the lower side of the display 120 according to various embodiments. The home key may be used to display the main home screen on the display 120. For example, when the home key is touched while a home screen that is different from the main home screen or a menu screen is displayed on the display 120, the main home screen may be displayed on the display 120. Furthermore, when the home key is touched while applications are being executed on the display 120, the main home screen may be displayed on the display 120. In addition, the home key may also be used to display recently used applications or a task manager on the display 120.

The menu key may provide a connection menu that may be used on the display 120. The connection menu may include a widget addition menu, a background screen switching menu, a search menu, an editing menu, an environment setting menu, etc. The back key may be used to display the screen that was executed just before the currently executed screen or to end the most recently used application.

A front camera, an indicator, an illuminance sensor, a proximity sensor, and the like may be disposed in the non-display area 122 at the outer periphery of the front surface 110a of the electronic device 100 according to various embodiments. A rear camera, a flash, a speaker, and the like may be disposed on the rear surface 110b of the electronic device 100. For example, a power/reset button, a volume button, a terrestrial DMB antenna for reception of broadcasting, one or more microphones, and the like may be disposed on the lateral rim 130 of the electronic device 100.

A connector may be disposed on the lower side of the lateral rim 130 of the electronic device 100 according to various embodiments. The connector may have a plurality of electrodes formed therein and may be connected to an external device in a wired manner. An earphone connecting jack may be disposed on the upper side of the lateral rim 130 of the electronic device 100. The plug of earphones may be inserted into the earphone connecting jack.

The electronic device 100, according to various embodiments, may include the metal rim 130 that surrounds the whole lateral side thereof. The rim 130 may be configured with a metal frame and may be employed as an antenna radiator of the electronic device 100. The rim 130 may include one or more cut-off portions (not illustrated) or insulating portions. Each of the segments of the rim 130 may operate as an antenna radiator and an auxiliary radiator.

The electronic device 100, according to various embodiments, may have a cover 140 disposed on the lower side of the rear surface 100b thereof. The cover 140 may be connected to rotate about a hinge axis A. Reference numeral 141 denotes a hinge arm.

Figure 2A:
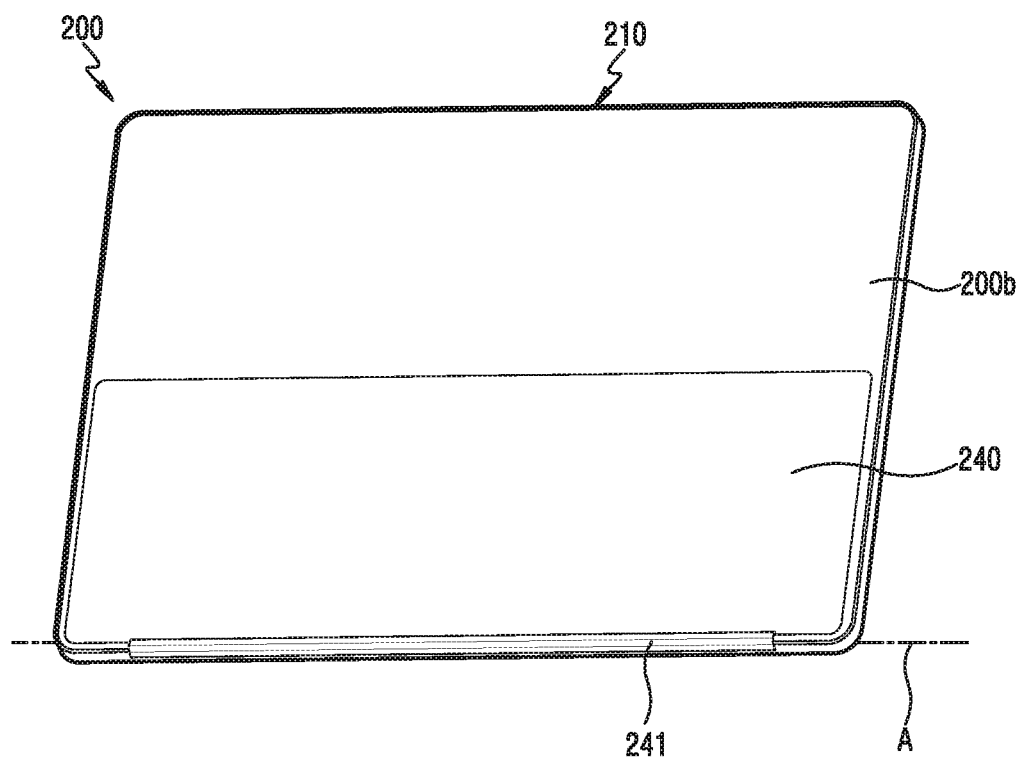
FIG. 2A is a perspective view illustrating a second surface of an electronic device that has standing units received in the main body thereof according to various embodiments of the present disclosure.
Figure 2B:
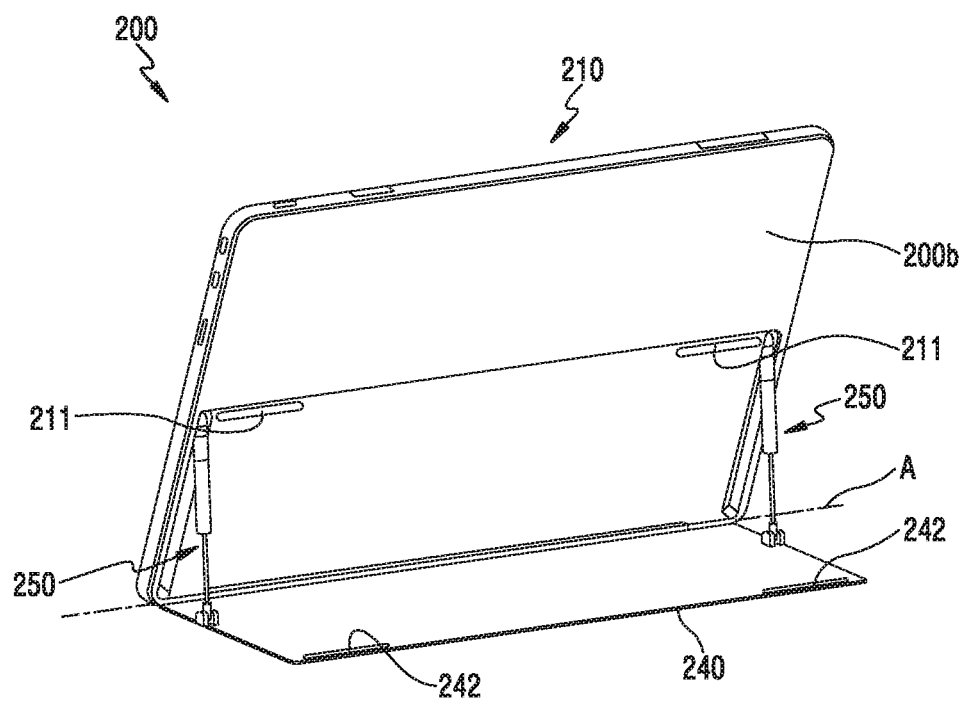
FIG. 2B is a perspective view illustrating the main body that is obliquely supported by the standing units according to various embodiments of the present disclosure.
Figure 2C:
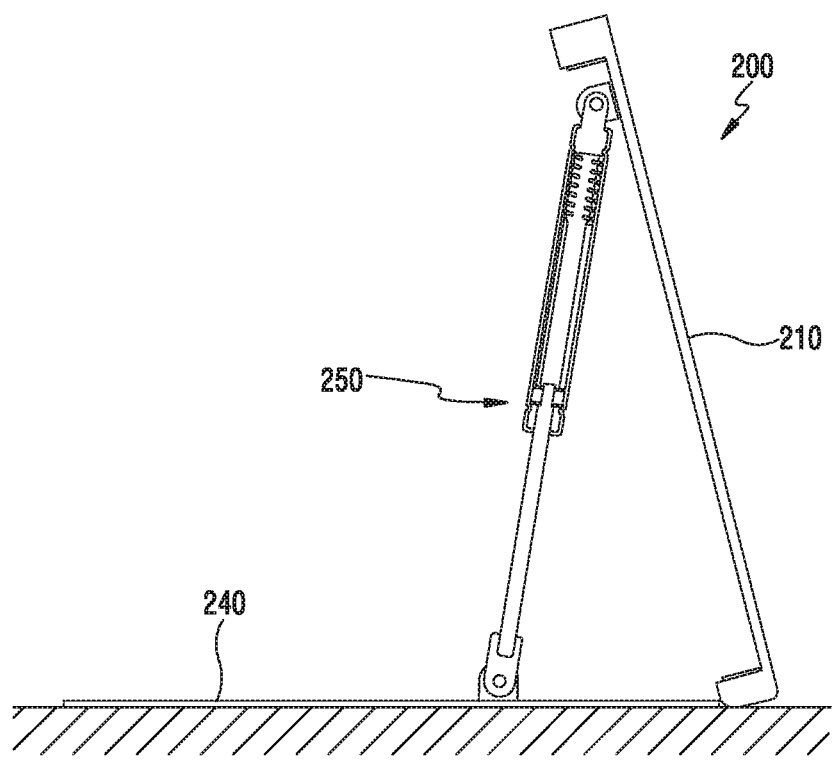
FIG. 2C is a side view illustrating the main body that is obliquely supported by the standing units according to various embodiments of the present disclosure.

FIG. 2A is a perspective view illustrating a second surface of an electronic device that has standing units received in the main body thereof according to various embodiments of the present disclosure. FIG. 2B is a perspective view illustrating the main body that is obliquely supported by the standing units according to various embodiments of the present disclosure. FIG. 2C is a side view illustrating the main body that is obliquely supported by the standing units according to various embodiments of the present disclosure.

Referring to FIGS. 2A to 2C, the electronic device 200, according to various embodiments, may be an electronic device that is the same as the electronic device 100 illustrated in FIGS. 1A and 1B. The electronic device, according to various embodiments, may include the main body 210, the standing units 250, and a cover 240. The electronic device 200, according to various embodiments, may include the cover 240 that is rotated about a hinge axis A in order to obliquely support the main body 210 and the standing units 250.

The standing units 250, according to various embodiments, which are supports that obliquely support the main body 210, may be disposed such that the standing units are hidden while being received in the second surface 200b of the main body. Furthermore, the standing units 250 may be extracted from the second surface 200b of the main body to obliquely support the main body 210 together with the cover 240. For example, the standing units 250 may be disposed on opposite ends of the second surface 200b of the main body in a symmetric arrangement to support the main body 210. The standing units 250 may be received in the second surface 200b or may be extracted from the second surface 200b to support the main body 210 through rotational, tensile, and compressive operations. The standing units 250, according to various embodiments, may be configured to be extended or compressed using a frictional, hydraulic, or resilient operation. Furthermore, the standing units 250, according to various embodiments, may be compressed so as to be received in the second surface 200b of the main body or may be extended so as to obliquely support the main body 210.

The cover 240, according to various embodiments, which is a unit for opening and closing the standing units 250 received in the second surface 200b of the main body, may be a bottom support that obliquely supports the main body 210 together with the standing units 250. The cover 240, according to various embodiments, may be formed in a plate shape and may have a hinge arm 241 formed along one end thereof such that the cover 240 may be connected to rotate about the lower end of the second surface 200b of the main body. For example, the cover 240 may be at least a part of the second surface 200b of the main body when being folded to the second surface 200b of the main body, and may operate as a bottom support together with one pair of standing units 250 when being extracted from the second surface 200b of the main body to obliquely support the main body 210.

A force causing a linear motion, such as compression or extension, may be generated by a rotational operation that occurs when the standing units, according to various embodiments, are received in, or extracted from, the main body. The force may cause a frictional force that is greater than, or equal to, the support force for obliquely supporting the main body.

The electronic device 200, according to various embodiments, may include a maintaining unit for maintaining the cover 240 in a closed state. The maintaining unit, according to various embodiments, may include one or more magnets 211 with a first polarity or first metal parts on the second surface 200b of the main body. Furthermore, the cover 240, according to various embodiments, may include one or more magnets 242 with a second polarity or second metal parts thereon. If the magnets 211 with the first polarity (e.g., a North pole) are mounted on the second surface 200b of the main body, the magnets 242 or first metal plates with the second polarity (e.g., a South pole) may be disposed on the cover 240. If magnets with the first polarity (e.g., a North pole) are mounted on the cover 240, magnets or second metal plates with the second polarity (e.g., a South pole) may be disposed on the corresponding portions of the second surface 200b of the main body. The cover 240 may be maintained in a closed state by the attractive force between the magnets or the attractive force between the magnets and the metal plates.

Figure 3A:
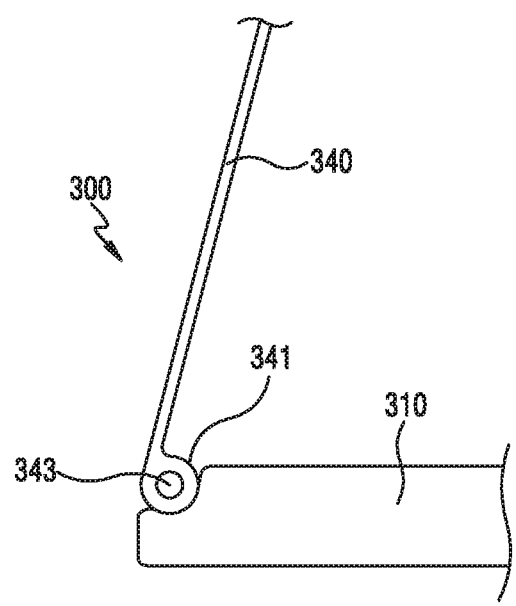
FIG. 3A is a sectional view illustrating a hinge unit of a cover according to various embodiments of the present disclosure.

FIG. 3A is a sectional view illustrating a hinge unit of a cover according to various embodiments of the present disclosure.

Referring to FIG. 3A, an electronic device 300, according to various embodiments, may be an electronic device that is the same as the electronic device 100 illustrated in FIGS. 1A and 1B. In the electronic device 300, according to various embodiments, the cover 340 may be connected to the main body 310 through the hinge unit to rotate about the lower end of the second surface of the main body 310. The hinge unit may include a hollow hinge arm 341 formed on the cover 340 and a hinge protrusion 343 formed on the lower end of the second surface of the main body. The hinge protrusion 343 may be coupled to the hinge arm 341 to provide a hinge axis for the cover 340.

Figure 3B:
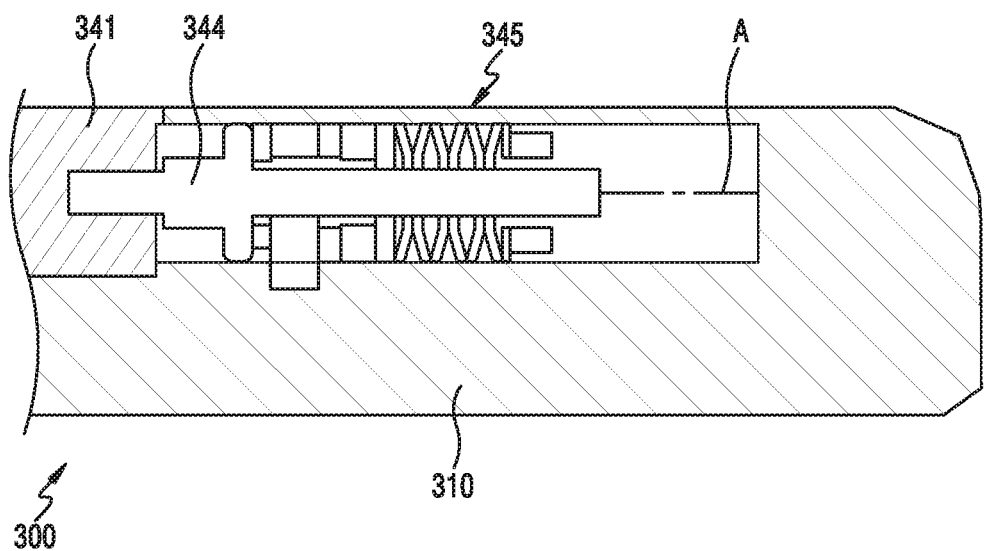
FIG. 3B is a sectional view illustrating a rotary friction type hinge unit of a cover according to various embodiments of the present disclosure.

FIG. 3B is a sectional view illustrating a rotary friction type hinge unit of a cover according to various embodiments of the present disclosure.

Referring to FIG. 3B, an electronic device 300, according to various embodiments, may be an electronic device that is the same as the electronic device 100 illustrated in FIGS. 1A and 1B. In the electronic device 300, according to various embodiments, the cover 340 may be connected to the main body of the electronic device through the hinge module 345 to rotate about the lower end of the second surface of the main body. The hinge module 345 may include a hollow hinge arm 341 formed on the cover and a hinge shaft 344 formed on the lower end of the second surface of the main body. The hinge shaft 344 may be coupled to the hinge arm 341 to provide a hinge axis A for the cover. The hinge module 345, according to various embodiments, may use a rotary friction method and may be disposed on opposite end portions of the hinge arm to connect the cover to the main body. The hinge module 345 may include a frictional member for rotary friction.

The rotary frictional force provided by the hinge module 345, according to various embodiments, may support the main body of the electronic device to prevent the main body from being moved when a touch operation is performed on (i.e., a push force is applied to) the display of the electronic device 300 that is obliquely supported.

Figure 4:
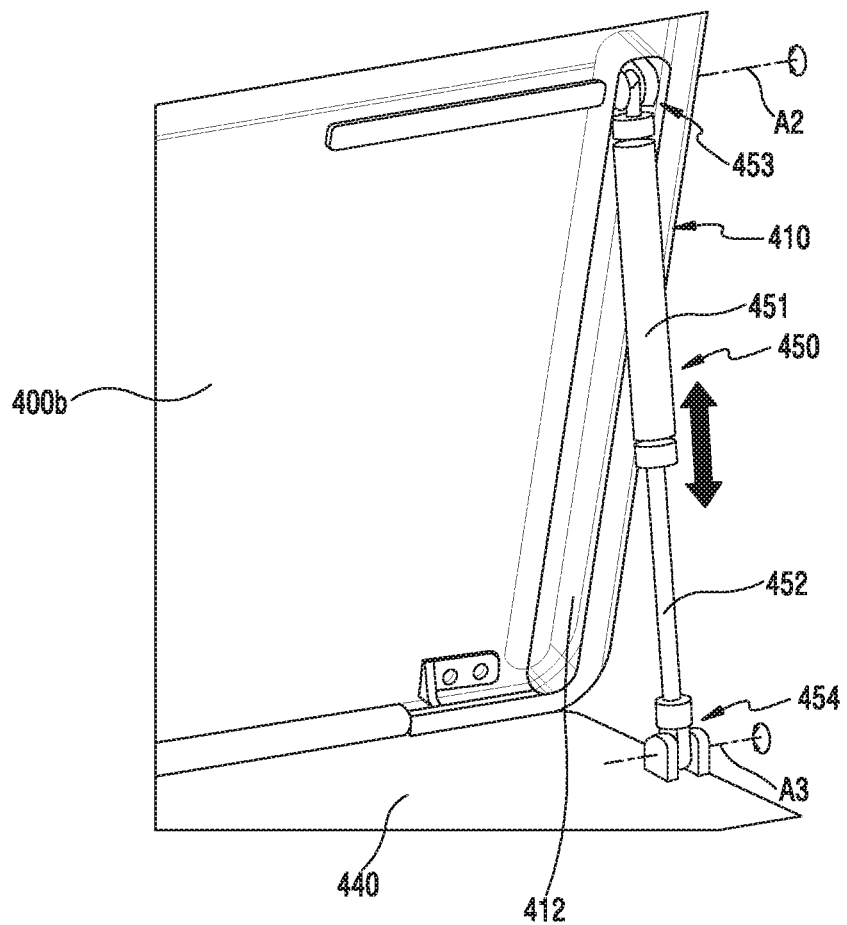
FIG. 4 is an enlarged perspective view illustrating the main body that is obliquely supported by standing units according to various embodiments of the present disclosure.

FIG. 4 is an enlarged perspective view illustrating the main body that is obliquely supported by standing units according to various embodiments of the present disclosure.

Referring to FIG. 4, the standing units 450, according to various embodiments, may be the same units as the standing units 250 illustrated in FIGS. 2A and 2B. The main body may have grooves (receiving spaces) 412 formed in opposite end portions of the second surface 400b thereof for receiving the standing units 450. The grooves 412 may have a tunnel shape that linearly extends in one direction and may receive the entirety of the compressed standing units 450. Since one pair of standing units 450, according to various embodiments, has the same configuration, only the configuration of one standing unit 450 will be described below.

The standing unit 450, according to various embodiments, may include a fixed part 451 and a moving part 452. One end of the fixed part 451 may be coupled to the second surface 400b of the main body. One end of the moving part 452 may be coupled to a cover 440, and the other end of the moving part 452 may be inserted into, or extracted from, the fixed part 451.

In the standing unit 450, according to various embodiments, one end of the fixed part 451 and one end of the moving part 452 may be rotatably coupled. One end of the fixed part 451 and one end of the moving part 452, according to various embodiments, may be configured with first and second hinge structures 453 and 454. Each of the typical first and second hinge structures 453 and 454 may include one pair of hinge arms and a hinge protrusion coupled to the hinge arms. Accordingly, the first hinge structure 453 at one end of the fixed part and the second hinge structure 454 at one end of the moving part may provide a second hinge axis A2 and a third hinge axis A3, respectively.

When the standing unit 450 is received in, or extracted from, the corresponding groove, one end of the fixed part 451 may rotate about the second hinge axis A2, and one end of the moving part may rotate about the third hinge axis A3.

The first hinge structure 453, according to various embodiments, may be disposed on the portion of the second surface 400b of the main body that corresponds to one corner of the received cover 440. Namely, the first hinge structure 453 may be located in the upper end portion of the groove 412. The second hinge structure 454, according to various embodiments, may be disposed on a slight lower side with respect to the center of the short side of the cover 440. The second hinge structure may be disposed on a point spaced apart from the lower end of the short side of the cover 440 by approximately a third of the short side of the cover.

Figure 5A:
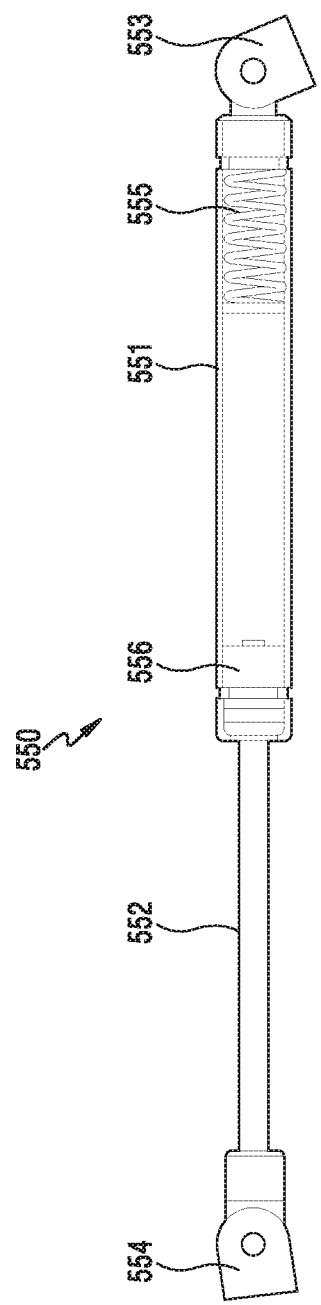
FIG. 5A illustrates the configuration of a standing unit according to various embodiments of the present disclosure.
Figure 5B:
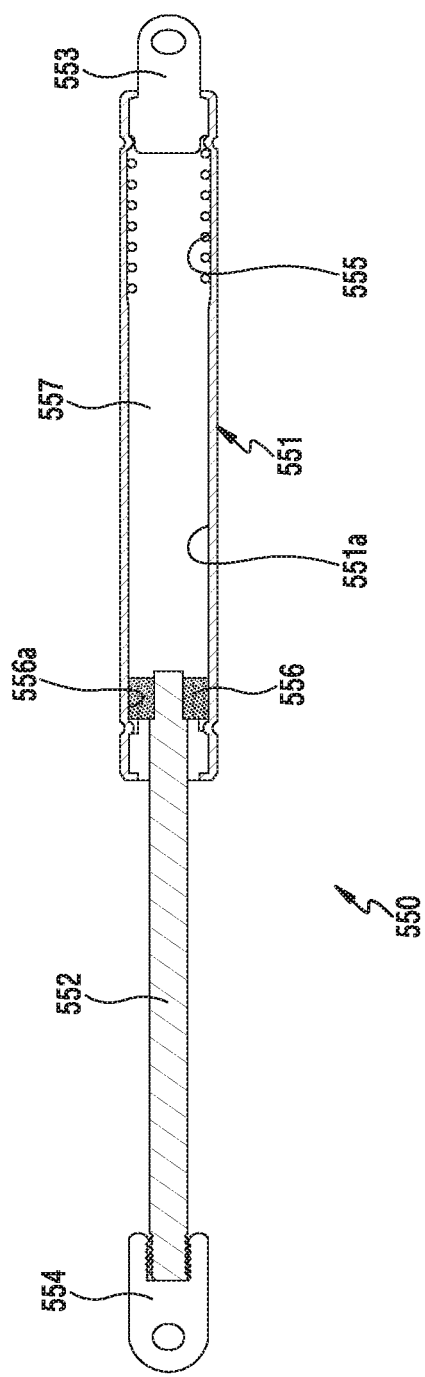
FIG. 5B is a sectional view illustrating the configuration of the standing unit according to various embodiments of the present disclosure.

FIG. 5A illustrates the configuration of a standing unit according to various embodiments of the present disclosure. FIG. 5B is a sectional view illustrating the configuration of the standing unit according to various embodiments of the present disclosure.

Referring to FIGS. 5A and 5B, the standing unit 550, according to various embodiments, may be the same unit as the standing units 250 illustrated in FIGS. 2A and 2B. The standing unit 550, according to various embodiments, may serve to support the main body using a hydraulic operation, a frictional operation, a resilient operation, or the like.

If the standing unit 550, according to various embodiments, is a frictional type standing unit, the standing unit 550 may include a fixed part 551, a moving part 552, and a frictional member 556 (hereinafter, referred to as the piston). The fixed part 551 may be a hollow metal member. The inner surface of the fixed part 551 may be a frictional surface with a diameter. The moving part 552 may be a metal rod member. The moving part 552 may have a cylindrical shape. The piston 556 made of metal may be fixed to the other end of the moving part 552 to reciprocate while performing a frictional sliding operation within the internal space of the fixed part 551. The standing unit 550 may obliquely support the main body by a frictional sliding operation between the inner surface 551a of the fixed part 551 and the outer circumferential surface 556a of the piston 556.

If the standing unit 550, according to various embodiments, is a hydraulic type standing unit, the standing unit 550 may include a fixed part 551, a moving part 552, a piston 556, and fluid 557. The fixed part 551 may be a hollow metal member. The inner surface of the fixed part 551 may be a frictional surface with a diameter. The fixed part 551 may be filled with air or the fluid 557. The moving part 552 may be a metal rod member. For example, the moving part 552 may have a cylindrical shape.

Although the moving part has a general cylindrical shape, the moving part may be designed to have a rectangular or track shape according to products. The piston 556 made of metal may be fixed to the other end of the moving part 552 to reciprocate while performing a frictional and sliding operation within the internal space of the fixed part 551.

In the case where the standing unit 550, according various embodiments, is a hydraulic type standing unit, the fluid 557 may be defined to be an air spring, a gas spring, or the like.

The standing unit 550, according to various embodiments, may further include a resilient member 555 within the fixed part 551. The resilient member 555 may be disposed in one area within the fixed part 551 along the internal space to operate in conjunction with the piston 556 that is provided on the inserted moving part 552. While the standing unit 550 is received in the main body, the piston 556 may be brought close to the resilient member 555, and a resilient force may be applied to the piston 556 in a direction away from the resilient member 555. Reference numerals 553 and 554 denote hinge members.

When an attempt is made to generate a frictional force between the frictional member and the inner surface of the fixed part according to various embodiments, wear is more likely to happen due to the nature of surface friction, and the frictional force may not be consistently generated on account of the wear of the surfaces that generate the force.

In order to solve the problem, the frictional member may be configured to have self-resilience by cutting away a part of the frictional member, instead of having a closed loop shape.

Figure 6A:
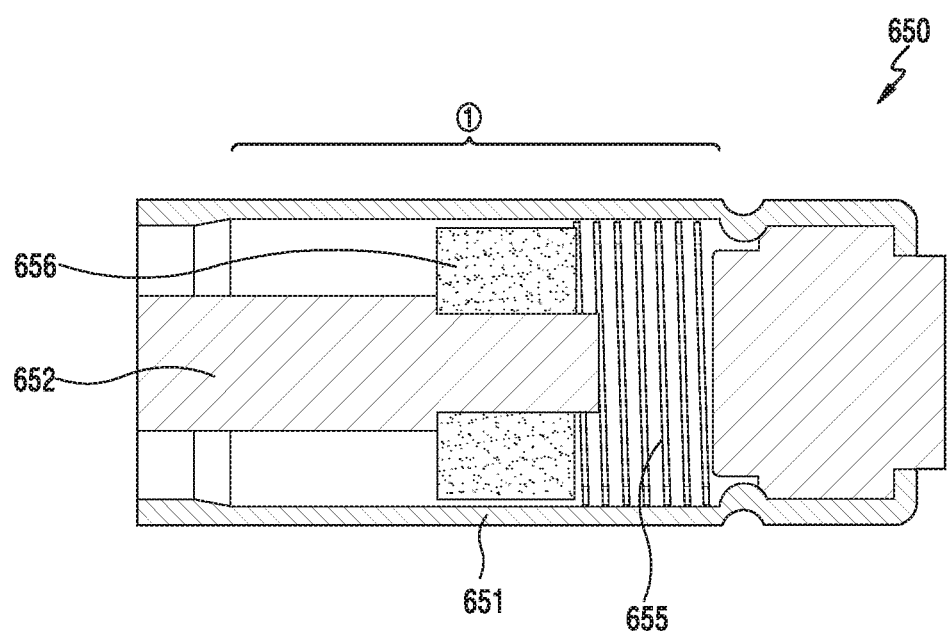
FIG. 6A illustrates a non-friction state (closed state) of a standing unit according to various embodiments of the present disclosure.
Figure 6B:
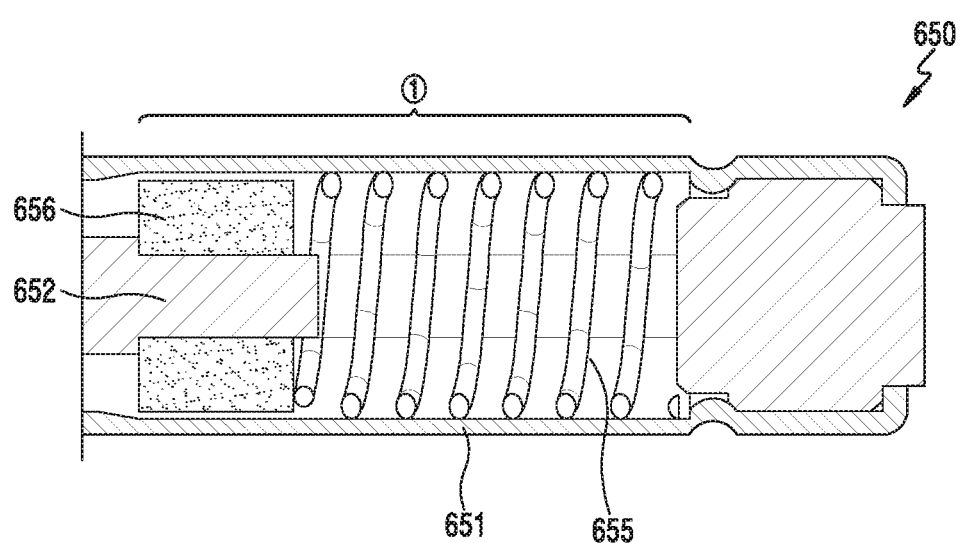
FIG. 6B illustrates a non-friction state (an initially opened state between five degrees and ten degrees) of the standing unit according to various embodiments of the present disclosure.
Figure 6C:
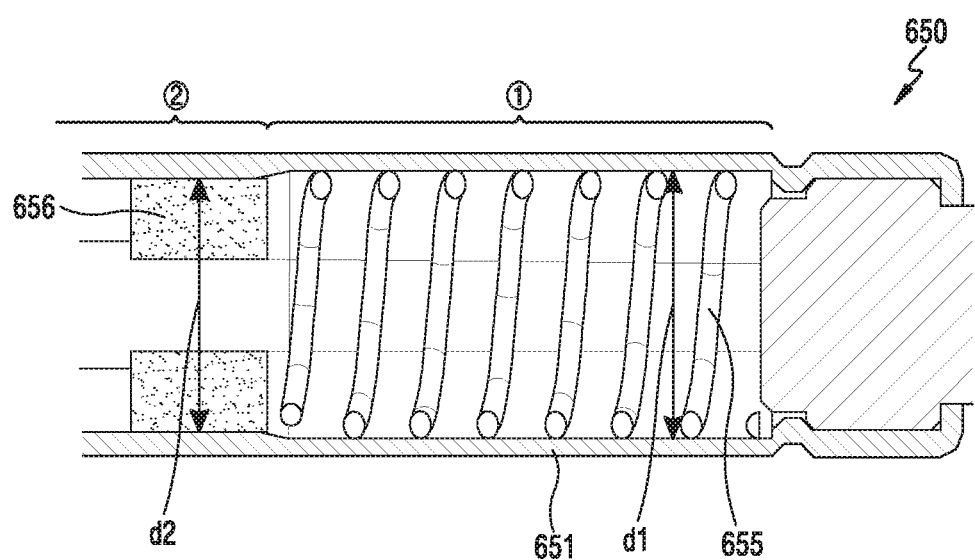
FIG. 6C is a sectional view illustrating a friction state of the standing unit according to various embodiments of the present disclosure.

FIG. 6A illustrates a non-friction state (closed state) of a standing unit according to various embodiments of the present disclosure. FIG. 6B illustrates a non-friction state of the standing unit (an initially opened state between five degrees and ten degrees) according to various embodiments of the present disclosure. FIG. 6C is a sectional view illustrating a friction state of the standing unit according to various embodiments of the present disclosure.

FIG. 6A illustrates a state in which a cover is completely closed to the main body, which is a state in which a resilient member 655 is compressed without the friction of a piston 656. FIG. 6B illustrates a state in which the cover is opened by about five degrees to ten degrees from the main body, which is a state in which the resilient member 655 is extended without the friction of the piston 656. FIG. 6C illustrates a state in which the cover is additionally opened by a user in order to adjust the cover at an arbitrary angle while the cover has been primarily opened by about five degrees to ten degrees, which is a state in which the resilient member is extended with friction of the piston.

In the state of FIG. 6A, the cover 240 may be brought close to the main body by virtue of the operating angle characteristic of the magnet or standing unit 250 (in the closed state, only a force for a linear motion is applied, and there is no rotational force).

Referring to FIGS. 6A to 6C, the standing unit 650, according to various embodiments, may be the same unit as the standing units 250 illustrated in FIGS. 2A and 2B.

An electronic device, according to various embodiments, may be configured such that a frictional force is rarely applied in the opening section ranging from about zero degrees to about ten degrees in order to enable a user to easily open the cover in an initial stage. Furthermore, the electronic device may include a resilient member that is provided in a specific section to push a frictional member and a moving part, thereby making the cover automatically opened when a specific force or more is applied thereto.

The electronic device, according to various embodiments, may have a section to which the friction of the standing unit 650 is not applied in order to enable the cover to be easily opened in an initial stage while the cover is received in the second surface of the main body, that is, while the cover is closed. It has already been described that the cover, according to various embodiments, may be maintained in the closed state, in which the cover is received in the second surface of the main body, using the magnetic force of magnets.

However, in the state in which the cover is closed, the resilient member may be compressed without friction (FIG. 6A); at a first angle, namely, between about five degrees and about ten degrees, there is no frictional force provided by the standing unit 650, and the resilient member may be extended; and in the state in which the cover is opened by about ten degrees or more, a support force by virtue of the frictional force provided by the standing unit 650 exists, and the resilient member may be extended. This is for easily opening the cover in the closed state. Accordingly, when the cover in the closed state is rotated by an initial force applied thereto, the cover can be easily opened to about ten degrees without applying a strong force.

A fixed part 651, according to various embodiments, may include a first portion ① having a first inner diameter d1 and a second portion ② having a second inner diameter d2. The first inner diameter d1 may be larger than the second inner diameter d2. The first portion ①, according to various embodiments, may be a section in which the piston 656 does not make contact with the inner surface of the fixed part 651 that has the first inner diameter so that a frictional force does not occur, and the second portion ② may be a section in which the piston 656 makes contact with the inner surface of the fixed part 651 that has the second inner diameter d2 so that a frictional force occurs.

Figure 7A:
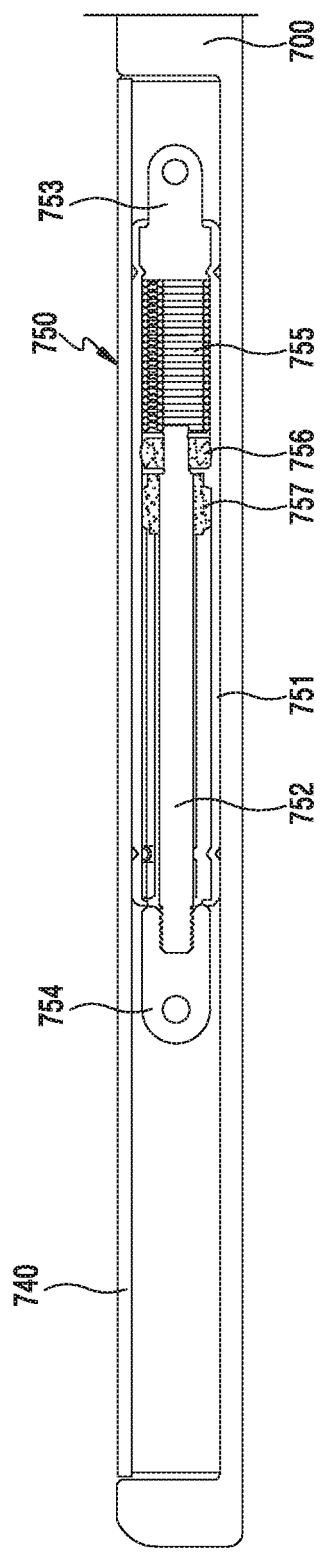
FIG. 7A illustrates a standing unit received in the main body according to various embodiments of the present disclosure.
Figure 7B:
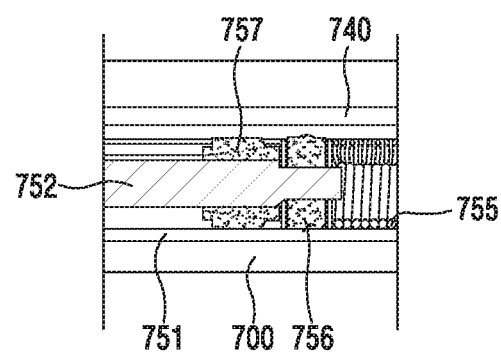
FIG. 7B is an enlarged view illustrating a state in which first and second frictional members of the standing unit are mounted according to various embodiments of the present disclosure.
Figure 7C:
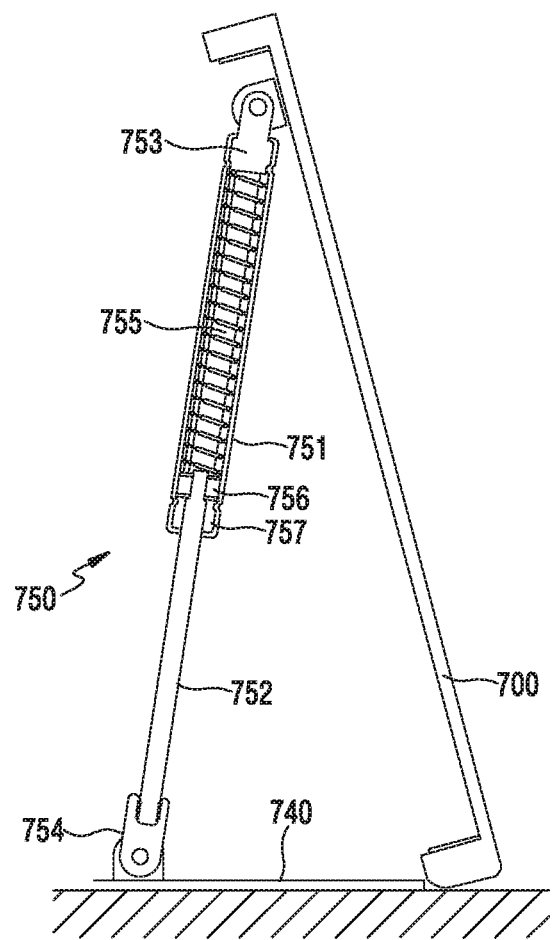
FIG. 7C is a sectional view illustrating the main body that is obliquely supported by the standing unit according to various embodiments of the present disclosure.

FIG. 7A illustrates a standing unit received in the main body according to various embodiments of the present disclosure. FIG. 7B is an enlarged view illustrating a state in which first and second frictional members of the standing unit are mounted according to various embodiments of the present disclosure. FIG. 7C is a sectional view illustrating the main body that is obliquely supported by the standing unit according to various embodiments of the present disclosure.

Referring to FIGS. 7A to 7C, the standing unit 750, according to various embodiments, may be the same unit as the standing units 250 illustrated in FIGS. 2A and 2B.

The standing unit 750, according to various embodiments, may include a fixed part 751, a moving part 752, a first frictional member 756 (hereinafter, referred to as the piston), and a resilient member 755. The fixed part 751 may be a hollow metal member. The inner surface of the fixed part 751 may be a frictional surface with a diameter. The moving part 752 may be a metal rod member. The moving part 752 may have a cylindrical shape. The piston 756 made of a synthetic resin or metal may be fixed to the other end of the moving part 752 to reciprocate while performing a frictional sliding operation within the internal space of the fixed part 751. The standing unit may obliquely support the main body by a frictional sliding operation between the inner surface of the fixed part 751 and the outer circumferential surface of the piston 756.

The resilient member 755, according to various embodiments, may be a compression coil spring and may be disposed in the internal space of the fixed part 751 along the longitudinal direction. The resilient member 755 may be maintained in the strongest compression state while the moving part 752 is completely inserted into the fixed part 751, and may be maintained in a weak compression state while the moving part 752 is extracted from the fixed part 751.

An electronic device, according to various embodiments, may further include a maintaining structure for maintaining the electronic device inclined by the standing unit and the cover.

Figure 7D:
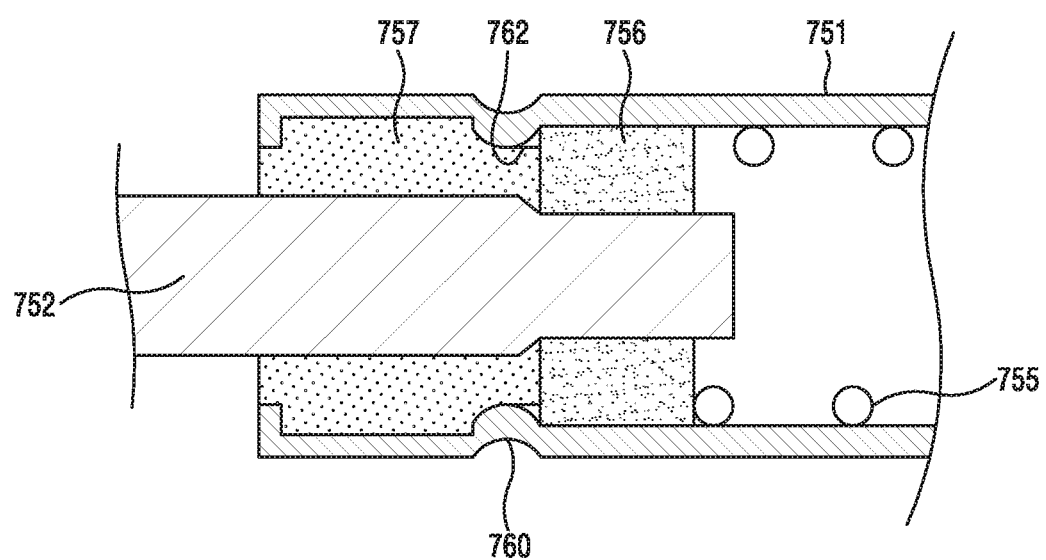
FIG. 7D is a sectional view illustrating the states of the first and second frictional members when the main body is obliquely supported by the standing unit according to various embodiments of the present disclosure.

FIG. 7D is a sectional view illustrating the states of the first and second frictional members when the main body is obliquely supported by the standing unit according to various embodiments of the present disclosure.

Referring to FIG. 7D, the maintaining structure, according to various embodiments, may include a stopper 760 in one end area of the fixed part 751 and the second frictional member 757 provided on the moving part 752.

The stopper 760, according to various embodiments, may centrally protrude from the inner surface of the fixed part 751. For example, the stopper 760 may have a ring shape.

The second frictional member 757, according to various embodiments, may be fixed to the moving part 752 so as to be parallel to the first frictional member (piston) 756. A groove corresponding to the stopper 760 may be formed in the second frictional member 757 or between the first and second frictional members 756 and 757. The first and second frictional members 756 and 757 may be independently manufactured and may then be arranged on the moving part 752. Furthermore, the first and second frictional members 756 and 757 may be formed of different materials. For example, the first frictional member 756 may be formed of a metal material, and the second frictional member 757 may be formed of a resilient material, such as rubber. Moreover, the first and second frictional members 756 and 757 may be arranged on the moving part 752 so as to be brought close to each other or slightly spaced apart from each other.

The outer surface of the second frictional member 757, according to various embodiments, may be disposed to be resiliently brought close to the inner surface of the fixed part 751. When the moving part 752 is completely extracted from the fixed part 751 (FIGS. 7C and 7D), the second frictional member 757 may be brought close to the other end of the fixed part 751, and the groove 762 may be engaged with the stopper 760. The engagement between the stopper 760 and the groove 762 may act as a maintaining force. The maintaining force may be a part of the force that is capable of maintaining the state illustrated in FIG. 7C. The first and second frictional members 756 and 757, according to various embodiments, may substantially have a cylindrical shape.

Figure 8A:
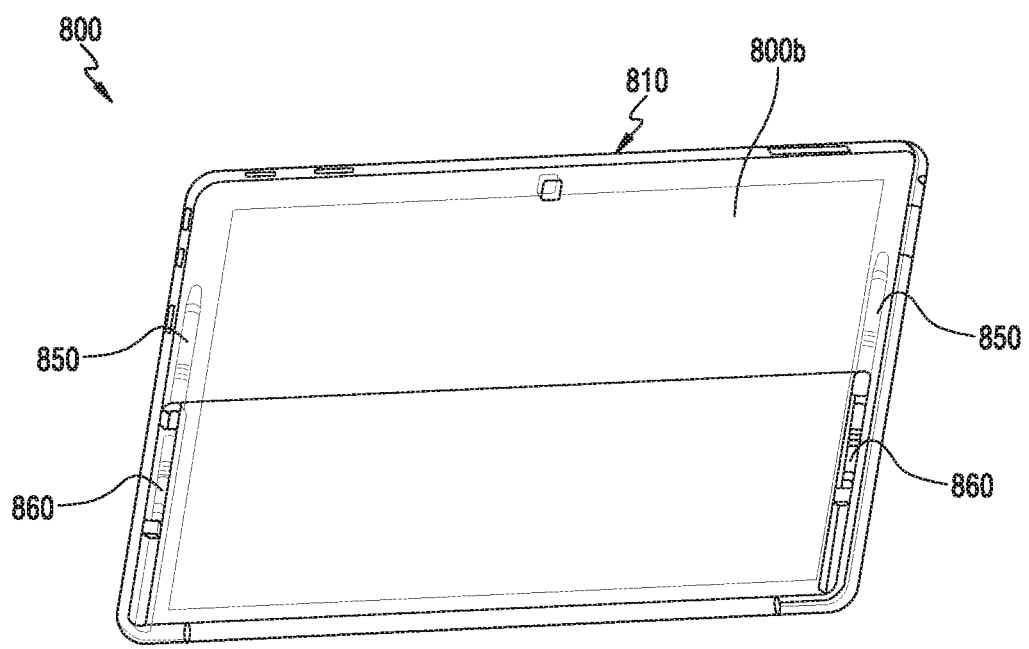
FIG. 8A is a perspective view illustrating a second surface of an electronic device that has standing units received in the main body thereof according to various embodiments of the present disclosure.
Figure 8B:
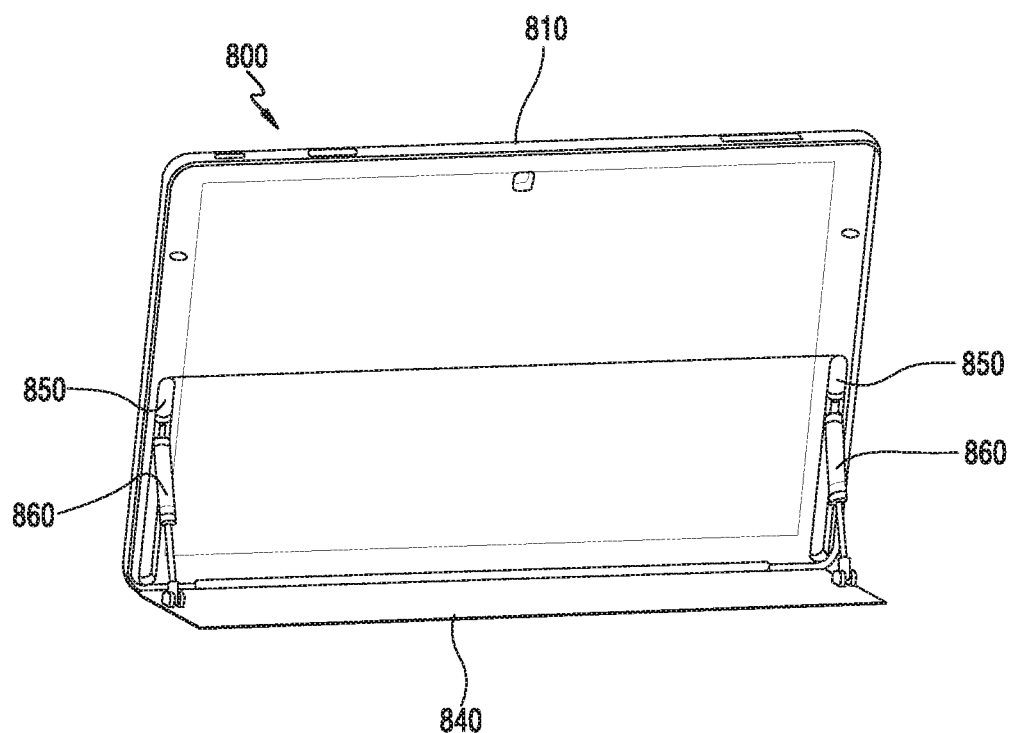
FIG. 8B is a perspective view illustrating the main body that is obliquely supported by the standing units according to various embodiments of the present disclosure.

FIG. 8A is a perspective view illustrating a second surface of an electronic device that has standing units received in the main body thereof according to various embodiments of the present disclosure. FIG. 8B is a perspective view illustrating the main body that is obliquely supported by the standing units according to various embodiments of the present disclosure.

Referring to FIGS. 8A and 8B, the electronic device 800, according to various embodiments, may include a standing unit 850, 860 for obliquely supporting the main body 810. The standing unit 850, 860, according to various embodiments, which is a support for obliquely supporting the main body 810, may include a sliding unit 850 and a support unit 860. By virtue of the movement of the sliding unit 850 and the support unit 860, the standing unit may be hidden in the main body 810, or may obliquely support the main body 810 together with a cover 840. The standing unit 850, 860, according to various embodiments, may be disposed to be hidden within the main body 810 by the cover 840. Furthermore, the standing unit 850, 860 may be extracted from the second surface 800b of the main body 810 to obliquely support the main body 810.

According to various embodiments, one pair of rod-type standing units may be disposed within the main body 810. The sliding unit 850 may substantially have a rod shape, and the support unit 860 may substantially have a rod shape. The sliding unit 850, according to various embodiments, may be rotatably connected with the support unit 860 in an articulated manner by a first hinge structure (FIG. 9A).

FIG. 8A illustrates a state in which the standing unit 850, 860, according to various embodiments, is received in the second surface 800b of the main body, and FIG. 8B illustrates a state in which the standing unit 850, 860 is extracted from the main body 810 to obliquely support the main body 810. The standing unit, according to various embodiments, may be disposed within the main body 810 or may be located outside the main body 810 to support the main body by an operation according to a combination of the sliding unit 850 and the support unit 860. The sliding unit 850, according to various embodiments, may be extended and compressed while being received in the second surface 800b of the main body. The support unit 860, according to various embodiments, may rotate and may be extended and compressed.

The cover 840, according to various embodiments, may be disposed on the second surface 800b of the main body and may operate in conjunction with the support unit 860. Furthermore, the cover 840 may allow the received sliding unit 850 and support unit 860 to be hidden and may serve to obliquely support the main body 810 together with the support unit 860.

Figure 9A:
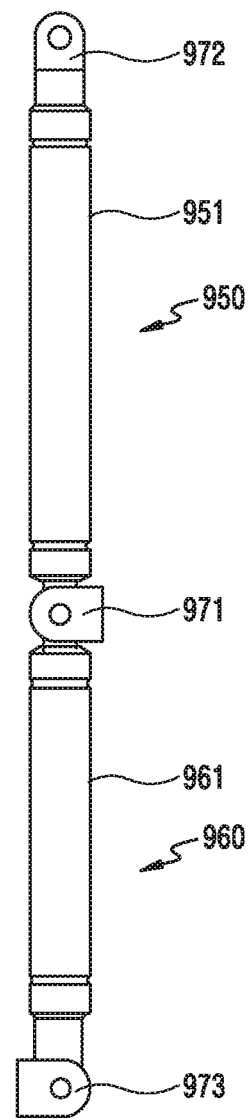
FIG. 9A illustrates the exterior of a standing unit received in the main body according to various embodiments of the present disclosure.
Figure 9B:
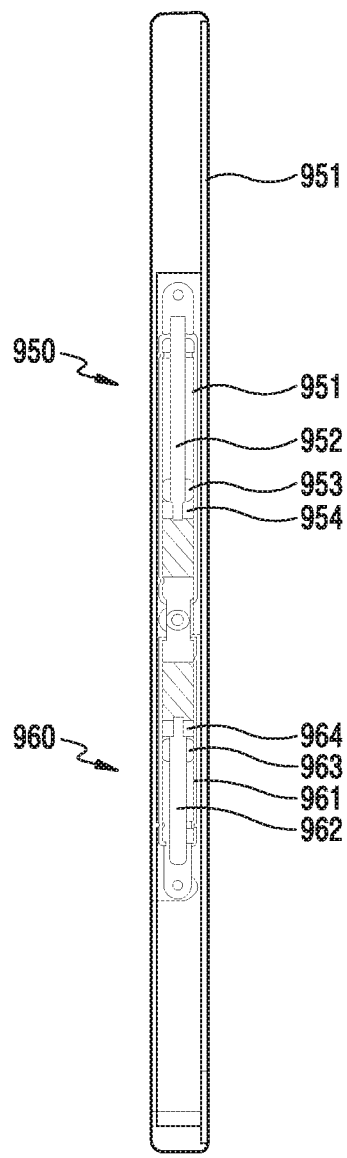
FIG. 9B is a sectional view illustrating the configuration of the standing unit received in the main body according to various embodiments of the present disclosure.

FIG. 9A illustrates the exterior of a standing unit received in the main body according to various embodiments of the present disclosure. FIG. 9B is a sectional view illustrating the configuration of the standing unit received in the main body according to various embodiments of the present disclosure.

Referring to FIGS. 9A and 9B, the standing unit, according to various embodiments, may include a sliding unit 950 and a support unit 960 that are connected with each other in an articulated manner by a first hinge structure 971. One end of the standing unit 950, 960 may be fixed to the second surface 900b of the main body by a second hinge structure 972, and the other end of the standing unit may be fixed to the cover by a third hinge structure 973.

The sliding unit 950, according to various embodiments, may include a first fixed part 951, a first moving part 952 inserted into or extracted from the first fixed part 951, and a first frictional member 953 fixed to the first moving part 952 to perform a frictional operation with the first fixed part 951. Furthermore, according to various embodiments, a third frictional member 954 may be fixed to the first moving part so as to be parallel to the first frictional member 953.

The support unit 960, according to various embodiments, may include a second fixed part 961, a second moving part 962 inserted into or extracted from the second fixed part 961, and a second frictional member 963 fixed to the second moving part 962 to perform a frictional operation with the second fixed part 961. Furthermore, according to various embodiments, a fourth frictional member 964 may be fixed to the second moving part so as to be parallel to the second frictional member 963. The elements that constitute the standing unit, according to various embodiments, may be substantially disposed in a linear form while being received within the main body.

The first and second moving parts 952 and 962, according to various embodiments, may have been inserted into the first and second fixed parts 951 and 961, respectively.

Figure 10A:
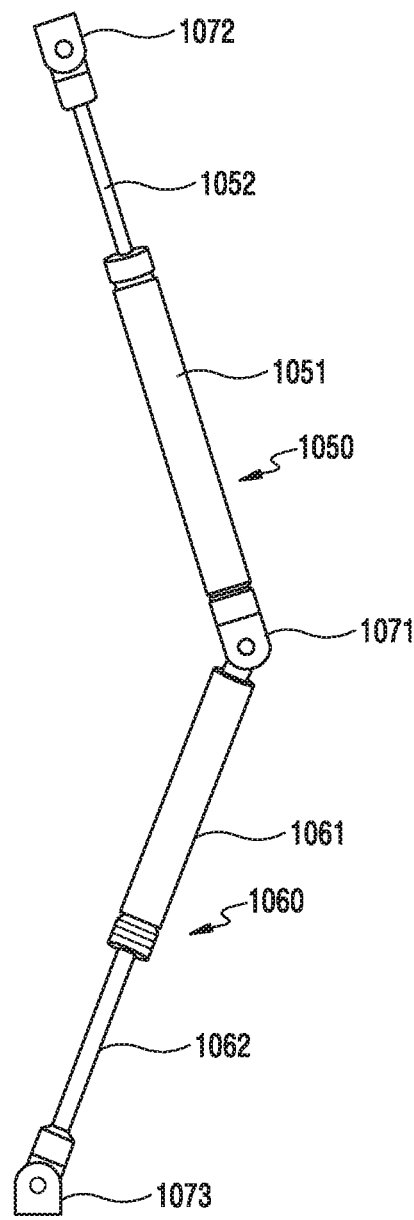
FIG. 10A illustrates the exterior of a standing unit while the main body is obliquely supported according to various embodiments of the present disclosure.
Figure 10B:
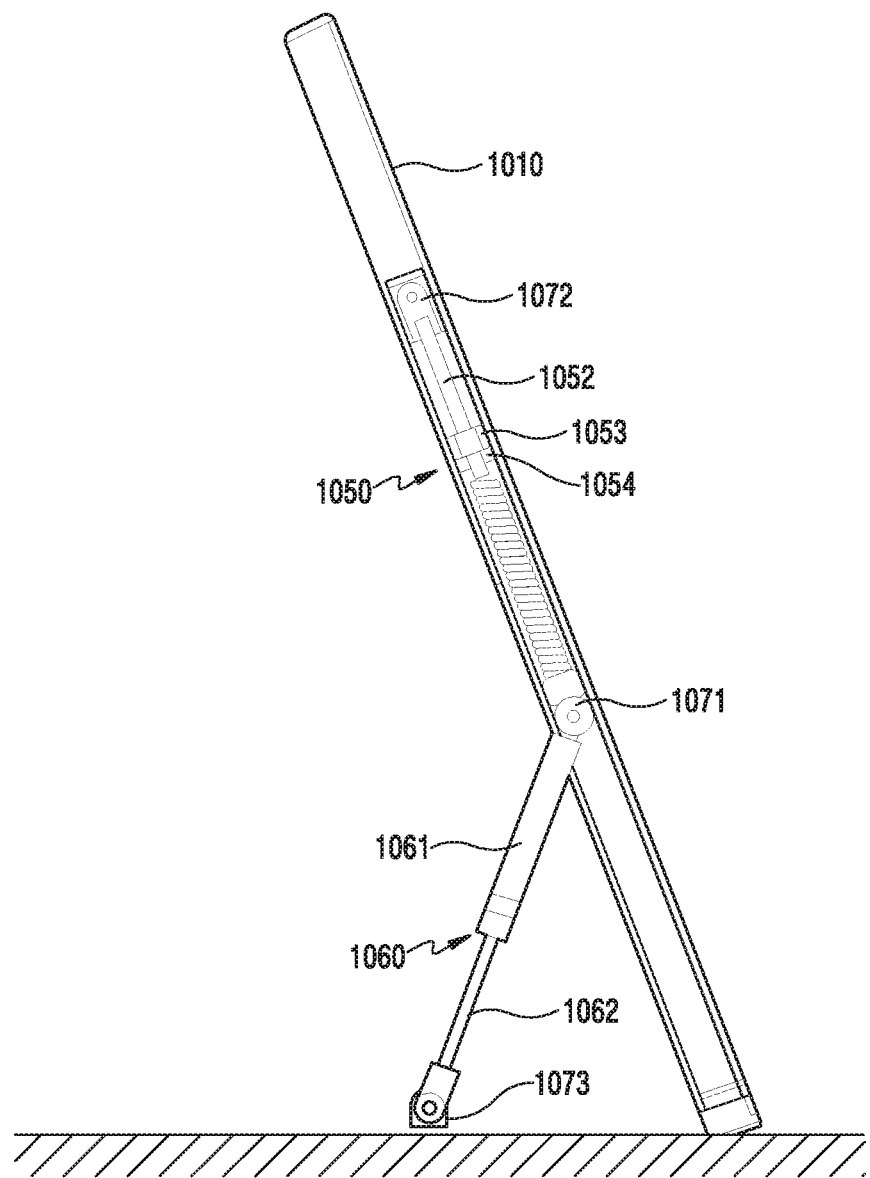
FIG. 10B is a sectional view illustrating the configuration of the standing unit while the main body is obliquely supported according to various embodiments of the present disclosure.

FIG. 10A illustrates the exterior of a standing unit while the main body is obliquely supported according to various embodiments of the present disclosure. FIG. 10B is a sectional view illustrating the configuration of the standing unit while the main body is obliquely supported according to various embodiments of the present disclosure.

Referring to FIGS. 10A and 10B, a first fixed part 1051 of a sliding unit 1050, according to various embodiments, may be rotatably connected, at one end thereof, to a moving part 1052 by a first hinge structure 1071 and may be rotatably connected, at the other end thereof, to the second surface of the main body. Furthermore, the first moving part 1052, according to various embodiments, may be rotatably connected, at one end thereof, to the second surface of the main body by a second hinge structure 1072 and may be connected, at the other end thereof, with the first fixed part 1051.

A second fixed part 1061 of a support unit 1060, according to various embodiments, may be rotatably connected, at one end thereof, to the first fixed part 1051 by the first hinge structure 1071 and may be connected, at the other end thereof, with a second moving part 1062. The second moving part 1062, according to various embodiments, may be rotatably connected, at one end thereof, to the cover by a third hinge structure 1073 and may be connected, at the other end thereof, with the second fixed part 1061.

Each of the second and third hinge structures 1072 and 1073, according to various embodiments, may include a hinge arm and a hinge protrusion, and may be fixed to the main body and the cover. The first hinge structure 1071, according to various embodiments, may move together with the sliding unit 1050. The first hinge structure 1071 may linearly move on the second surface of the main body. The first hinge structure 1071 that connects the sliding unit 1050 and the support unit 1060 is a portion to be bent and may provide a joint form of frame.

The sliding unit 1050 and the support unit 1060, according to various embodiments, may be compressed when being received in the first surface of the main body 1010 and may be extended when being extracted from the first surface of the main body 1010.

An electronic device, according to various embodiments, may include the first and second maintaining units illustrated with reference to FIGS. 2 and 7D.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

At least a part of an apparatus (e.g., modules or functions thereof) or method (e.g., operations) according to the present disclosure may be, for example, implemented as instructions stored in a computer-readable storage medium in a form of a programming module. In case that the instruction is executed by a processor, and the processor may perform functions corresponding to the instructions. The computer-readable storage media may be the memory, for instance.

The computer-readable recording medium may include a hard disk, a floppy disk, and a magnetic medium (e.g., a magnetic tape), an optical medium (e.g., a Compact Disc-Read Only Memory (CD-ROM) and a Digital Versatile Disc (DVD)), a Magneto-Optical Medium (e.g., a floptical disk), and a hardware device (e.g., a Read Only Memory (ROM), a Random Access Memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present disclosure, and vice versa.

The module or programming module according to the present disclosure may include at least one or more of the aforementioned constituent elements, or omit some of the aforementioned constituent elements, or further include additional other constituent elements. Operations carried out by the module, the programming module or the other constituent elements according to the present disclosure may be executed in a sequential, parallel, repeated or heuristic method. Also, some operations may be executed in different order or may be omitted, or other operations may be added.

Accordingly, a method and electronic device are provided for controlling a display according to the present disclosure, to determine the priority of display based on a user's preference, thereby being able to decrease a search time for display and more quickly display a desired screen.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a main body that comprises a first surface on which a display is disposed and a second surface that is opposite to the first surface;
a standing unit received in the second surface of the main body so as to be concealed from the outside, or extracted from the second surface of the main body so as to obliquely support the main body; and
a cover disposed on the second surface of the main body to operate in conjunction with the standing unit, the cover being configured to allow the received standing unit to be hidden and to obliquely support the main body together with the standing unit,
wherein the standing unit is received in, or extracted from, the second surface by rotational, tensile, and compressive operations.

2. The electronic device of claim 1, wherein the cover is connected to the main body by a hinge unit to rotate about the lower end of the second surface of the main body and is configured to open and close the standing unit,
wherein the cover is structured with a plate shape and is configured to operate as a bottom support.

3. The electronic device of claim 2, wherein the hinge unit is configured to include a rotary frictional force provide a support force for maintaining the main body in an inclined state together with the standing unit.

4. The electronic device of claim 1, wherein the standing unit is compressed so as to be received in the second surface of the main body, or is extended to obliquely support the main body.

5. The electronic device of claim 1, wherein the standing unit comprises:
a fixed part structured with a frictional surface;
a moving part inserted into, or extracted from, the fixed part and configured to perform a linear motion; and
a first frictional member made of metal, the first frictional member being fixed to the moving part and configured to perform a frictional operation with the frictional surface of the fixed part.

6. The electronic device of claim 5, wherein the fixed part is rotatably connected, at one end thereof, to the second surface of the main body by a first hinge structure and is connected, at the other end thereof, to the moving part; and the moving part is rotatably connected, at one end thereof, to the cover by a second hinge structure and is connected, at the other end thereof, to the fixed part.

7. The electronic device of claim 5, wherein the standing unit further comprises a first resilient member compressed or extended along a longitudinal direction of the fixed part, and the first resilient member is configured to support the first frictional member.

8. The electronic device of claim 7, wherein the fixed part comprises:
  a first section structured with a first diameter and configured to control the closing (zero degrees) or initial opening (five degrees to ten degrees) of the cover by the compression and extension of the resilient member without friction with the first frictional member; and
  a second section structured with a second diameter smaller than the first diameter and configured to generate friction with the first frictional member.

9. The electronic device of claim 8, wherein the fixed part comprises a second resilient member disposed in the second section, the second resilient member being disposed to be brought close to the first frictional member to support the first frictional member, and the second resilient member is configured to provide an initial opening force.

10. The electronic device of claim 1, further comprising:
  a first maintaining unit configured to provide a force for maintaining the cover in a closed state in a first position on the second surface of the main body when the cover is in the closed state in the first position,
  wherein the first maintaining unit comprises a magnet or a metal material.

11. The electronic device of claim 10, wherein the main body further comprises a magnet with a first polarity or a first metal material that is provided on at least a part of the second surface thereof, and the cover further comprises a magnet with a second polarity or a second metal material that is provided on at least a part thereof.

12. The electronic device of claim 1, further comprising:
  a second maintaining unit configured to provide a force for maintaining the main body in a second position where the main body is obliquely supported by the standing unit.

13. The electronic device of claim 12, wherein the second maintaining unit further comprises a second frictional member fixed to a moving part and having resilience, and
  the second frictional member is disposed beside a first frictional member to provide a stopping force by a coupling structure with a first portion of the fixed part.

14. The electronic device of claim 13, wherein the first portion comprises a stopper centrally protruding from the other end portion of the fixed part.

15. An electronic device comprising:
  a main body that comprises a first surface on which a display is disposed and a second surface that is opposite to the first surface;
  a standing unit that comprises a sliding unit and a support unit connected with the sliding unit, wherein the sliding unit is configured to move while being received in the second surface of the main body, and the support unit is disposed to be concealed from the outside or is extracted from the second surface of the main body to obliquely support the main body; and
  a cover disposed on the second surface of the main body to operate in conjunction with the support unit, the cover being configured to allow the received sliding unit and support unit to be hidden and to obliquely support the main body together with the support unit,
  wherein the sliding unit is configured to perform tensile and compressive operations within the main body, the support unit is configured to perform rotational, tensile, and compressive operations, and the sliding unit and the support unit are configured to move similar to a joint.

16. The electronic device of claim 15, wherein the sliding unit and the support unit are configured in a rod shape and are disposed in a rod type while being received in the main body.

17. The electronic device of claim 15, wherein the sliding unit is rotatably connected with the support unit in an articulated manner by a first hinge structure,
  wherein the sliding unit comprises:
    a first fixed part;
    a first moving part inserted into, or extracted from, the first fixed part; and
    a first frictional member fixed to the first moving part and configured to generate a frictional operation with the first fixed part, and
  the support unit comprises:
    a second fixed part;
    a second moving part inserted into, or extracted from, the second fixed part; and
    a second frictional member fixed to the second moving part and configured to generate a frictional operation with the second fixed part.

18. The electronic device of claim 17, wherein the first fixed part is rotatably connected, at one end thereof, to the second fixed part by the first hinge structure and is connected, at the other end thereof, to the first moving part;
  one end of the first moving part is configured to slide within the first fixed part, and the other end of the first moving part is rotatably connected to the second surface of the main body by a second hinge structure;
  the second fixed part is rotatably connected, at one end thereof, with the first fixed part by the first hinge structure and is connected, at the other end thereof, with the second moving part; and
  the second moving part is rotatably connected, at one end thereof, to the cover by a third hinge structure and is connected, at the other end thereof, to the second fixed part.

19. The electronic device of claim 18, wherein the second and third hinge structures are fixed, and the first hinge structure is configured to move together with the sliding unit to make a rotary motion of the first moving part and the second fixed part effective.

20. The electronic device of claim 17, wherein the sliding unit and the support unit are compressed when being received in the first surface of the main body and are extended when being extracted from the first surface of the main body.

* * * * *